May 9, 1961 O. B. BERLINGS 2,983,462
FILM CASSETTE
Filed May 20, 1958
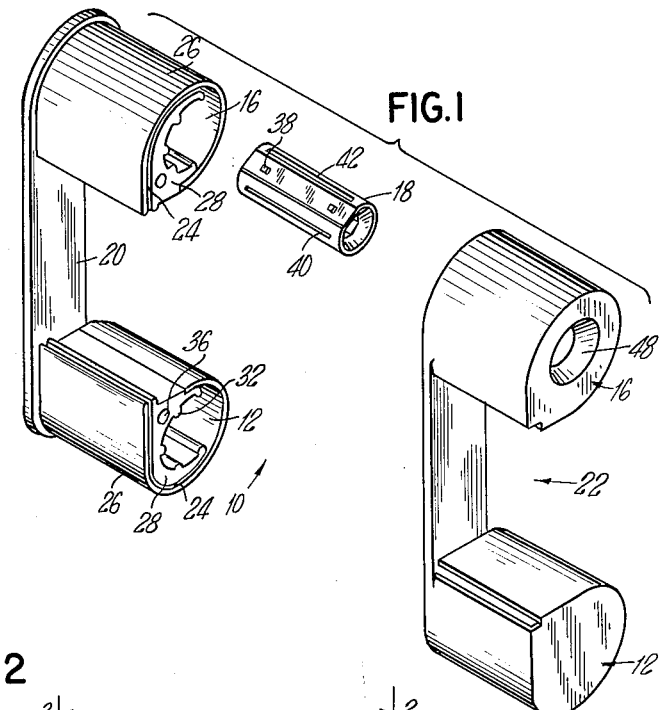
FIG. 1
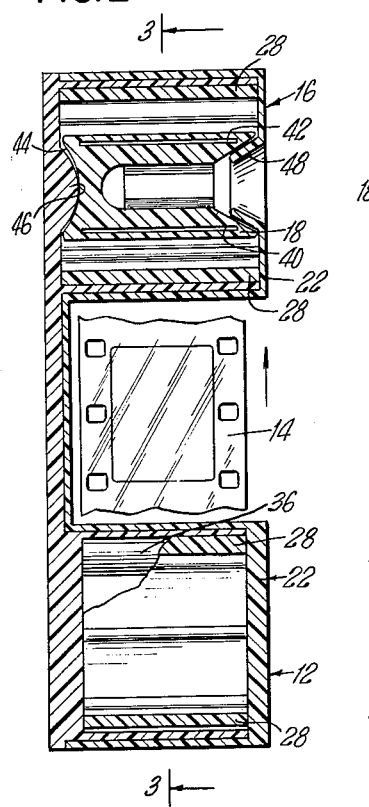
FIG. 2
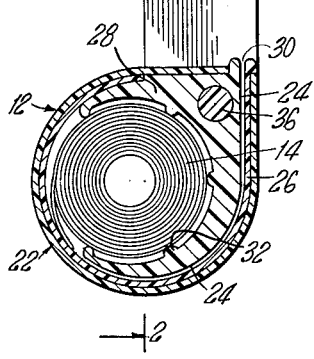
FIG. 3
FIG. 4
INVENTOR.
ORESTS B. BERLINGS
BY Howard Myles Schwinger
ATTORNEY United States Patent Office 2,983,462
Patented May 9, 1961

2,983,462
FILM CASSETTE
Orests B. Berlings, 7501 Ridge Blvd., Brooklyn, N.Y.
Filed May 20, 1958, Ser. No. 736,526
1 Claim. (Cl. 242—71.2)

This invention relates to film cassettes and more particularly, to a double cassette for sub-miniature cameras.

Conventional cassettes consisting of two cylindrical casings joined by an elongated connecting member and having outwardly directed felt-lined flanged openings present many disadvantages to the film loader. For example, lint from the felt-lined openings tends to dust off upon the negative thereby preventing exposure of such dust covered areas and producing an entirely dissatisfactory effect particularly upon enlargement. Felt is utilized in the cassette to shield the cassette from light. The dark felt acts as a light trap.

Moreover, in conventional cassettes, the thickness of the film passage cannot be varied to accommodate film which is thicker than conventional film.

Furthermore, the conventional take-up roller is faulty in many respects. For example, such rollers are usually provided with a metal clamp under which the film is inserted to insure that the film is held in proper alignment when driven by the roller. However, with such an arrangement the film tends to slip out of its anchorage. If the film is doubled over the metal clamp to insure that it will not slip, the film may break upon bending.

Additionally, it is difficult to center the roller in the take-up casing.

Lastly, no provision has been made in conventional cassettes to reduce resistance against the moving elements. This condition is conducive to slippage of the film and jamming of the film.

It is therefore amongst the primary objects of the present invention to provide a cassette which satisfactorily shields the cassette against light without the provision of felt and the like.

It is another important object of the present invention to provide a cassette having film passages which may be readily varied to accommodate film of varying thickness.

It is a further object of the present invention to provide a take-up roller for a cassette of the above character wherein the film driven thereby will be securely held in proper alignment and readily anchored on said take-up roller.

It is yet another object of the present invention to reduce the resistance working against the moving elements in a cassette.

Briefly stated, a cassette in accordance with the present invention comprises a casing which includes a curved wall for containing a roll of film, said casing having a film opening formed therein, a curved film passage formed within said casing communicating with said opening, said film passage being formed by the curved portion of the casing wall and an interiorly disposed curved casing member spaced apart therefrom.

A fuller understanding of the invention and the manner in which its objectives and advantages may be realized will become apparent from the following detailed description thereof taken in connection with the accompanying drawing wherein:

Fig. 1 is an exploded view in perspective of the primary elements of a cassette in accordance with the present invention;

Fig. 2 is a sectional view of the cassette of Fig. 1 taken on lines 2—2 of Fig. 3;

Fig. 3 is a sectional view of the cassette taken on line 3—3 of Fig. 2 in the direction of the arrows; and Fig. 4 is an exploded view in perspective showing the manner of varying the thickness of the film passage in accordance with the present invention.

Referring now to the drawing and more particularly to Fig. 1 thereof, a cassette in accordance with the present invention, designated generally by numeral 10, is shown consisting of a supply casing 12 for containing a roll of film 14 to be unwound and exposed, a take-up casing 16 for containing said roll after exposure and rewinding, a take-up roller 18 centrally disposed within said take-up casing for driving the film, a connecting bar 20 affixed to and extending between said casings for maintaining the same a fixed distance apart, and a removable closure member 22 adapted to provide access to both supply casing 12 and take-up casing 16. The cassette and its constituent parts are preferably of a molded plastic composition.

As may be best seen in Fig. 3, a film passage 24 is formed in both supply casing 12 and take-up casing 16 by the curved portion 26 of the casing outer wall and a curved inner member 28 spaced apart therefrom. Each film passage communicates with an opening 30 formed in its respective wall through which the film is fed from the supply casing to the take-up casing and during which process it is exposed. As is shown in the drawing, the casing interior presents a circular cavity which best accommodates the circular film roll. The casing interior is formed in part by curved inner member 28 which is provided on its underside with a plurality of ribs 32 against which the film roll abuts when of sufficient diameter. The ribs serve to reduce the surface against which the film roll abuts thereby considerably reducing the resistance of the inner wall of the casing against the moving film roll.

As is evident from Fig. 4, inner member 28 is removably affixed within each casing having a slot 34 formed within its thickened shoulder for the insertion of a stud 36 which extends from the casing wall. By virtue of this construction, member 28 may readily be removed from the casing by hand. This feature is of significance when it is desired to load the cassette with film of greater than conventional thickness. Ordinarily, the film passage will not be large enough to accommodate film of such thickness. However, by interchanging member 28 with a similar member which forms a larger film passage, a film passage of requisite size may easily be obtained thereby eliminating any tendency to load the cassette with film which may jam in the film passages. Of course, a cassette in accordance with the present invention will be provided with a number of such removable members for forming film passages to accommodate film of all thickness.

Take-up casing 16 is provided with centrally disposed take-up roller 18 which cooperates with a thumb lever advance (not shown) for driving or advancing the film. As is evident from the drawing, take-up roller 18 is provided with teeth upon which the perforated film is anchored, as is shown in Fig. 3. The roller is also slotted at 40 and 42 to additionally anchor the lead portion of the film to the roller. The take-up roller teeth are designated by numeral 38.

As may be best seen in Fig. 2, one end of roller 18 is recessed at 44 to receive convex extension 46 extending from the casing wall. It is to be noted that the curvature of the recess is greater than the curvature of extension 46. By virtue of this ball and socket arrangement the friction between the roller and the casing wall is held to a minimum. Additionally, this arrangement facilitates the proper alignment of the roller in the take-up casing.

The other end of roller 18 is interiorly tapered to receive tapered flange 48 extending from the take-up roller cap of closure member 22. Again, this construction serves to facilitate the proper alignment of roller in casing and holds friction to a minimum.

It may be seen that by virtue of the present invention, a cassette has been provided which satisfactorily shields the cassette against light without the provision of felt and the like; which is provided with a film passage which may be readily varied to accommodate film of varying thickness; wherein the resistance against moving elements is reduced to a minimum; and wherein a take-up roller is provided by means of which the lead portion of the film may be readily and reliably anchored.

Although the invention has been described in detail with respect to one preferred embodiment thereof, it will be understood by those skilled in the art, after reading this specification, that various changes and modifications may be made without departing from the spirit of the invention and the scope of the appended claim.

What is claimed as new and desired to be secured by Letters Patent is:

A double chambered cassette comprising a casing having a substantially cylindrical film supply chamber and a substantially cylindrical film take up chamber spaced therefrom, each chamber having a curvilinear wall about the major portion of its circumference and a straight wall, each chamber having a light free film passage therein, and each chamber having a narrow elongated film slot formed therein at the end of each film passage, said film slots confronting each other at the adjacent ends of said straight wall portion, a connecting bar connected to and extending between said chambers and lying in a plane perpendicular to the axes of said chambers and perpendicular to said slots, said chambers being spaced apart on said connecting bar a distance sufficient to expose film in the space therebetween, each film passage being formed between the curvilinear wall of its associated chamber and an additional interchangeable curved casing member having a curved wall conforming to the curvilinear wall and a straight wall portion conforming to the straight wall of the chamber, said interchangeable casing member being adapted to be replaced to accommodate films of different thicknesses, each said curved casing members having spaced apart ribs extending from the curved portion thereof, each said curved members being removably mounted in its chamber and spaced apart from the chamber walls partitioning the film passage from the remainder of said chamber, a convex extension extending from the connecting bar into the interior of said take up chamber, and a take up roller having a concaved end portion engaged over said convex extension and positioned in said take up chamber for driving the film.

References Cited in the file of this patent

UNITED STATES PATENTS

| | | |
|---|---|---|
| 1,009,673 | Lang | Nov. 21, 1911 |
| 1,479,454 | Carr | Jan. 1, 1924 |
| 1,686,650 | Chanier | Oct. 9, 1928 |
| 2,011,624 | Della Gana | Aug. 20, 1935 |
| 2,032,214 | Howell | Feb. 25, 1936 |
| 2,144,622 | Frost | Jan. 24, 1939 |
| 2,195,268 | Cazes | Mar. 26, 1940 |
| 2,381,033 | Bolsey | Aug. 7, 1945 |
| 2,492,900 | Swenson | Dec. 27, 1949 |
| 2,673,500 | Cassidy et al. | Mar. 30, 1954 |
| 2,701,507 | Bergerhoff | Feb. 8, 1955 |

FOREIGN PATENTS

| | | |
|---|---|---|
| 430,730 | Great Britain | Apr. 14, 1934 |
| 501,355 | Great Britain | Feb. 27, 1939 |